United States Patent
Wang (10) Patent No.: US 8,559,272 B2
(45) Date of Patent: *Oct. 15, 2013

(54) ACOUSTIC LOGGING WHILE DRILLING TOOL HAVING RAISED TRANSDUCERS

(75) Inventor: Tsili Wang, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 678 days.

This patent is subject to a terminal disclaimer.

(21) Appl. No.: 12/783,618

(22) Filed: May 20, 2010

(65) Prior Publication Data

US 2011/0286307 A1 Nov. 24, 2011

(51) Int. Cl.
*E21B 47/16* (2006.01)
*G01V 1/00* (2006.01)
*G01V 3/00* (2006.01)

(52) U.S. Cl.
USPC ......... 367/82; 367/25; 340/854.3; 340/854.5; 340/856.4

(58) Field of Classification Search
USPC ........ 340/853.1, 854.3, 854.5, 856.4; 367/14, 367/25, 76, 81, 82; 702/5, 6; 175/45, 76
See application file for complete search history.

(56) References Cited

U.S. PATENT DOCUMENTS

| | | | |
|---|---|---|---|
| 4,594,691 A | 6/1986 | Kimball et al. | |
| 4,698,792 A | 10/1987 | Kurkjian et al. | |
| 4,774,693 A | 9/1988 | Winbow et al. | |
| 4,779,236 A | 10/1988 | Sondergeld | |
| 5,278,805 A | 1/1994 | Kimball | |
| 5,639,997 A | 6/1997 | Mallett | |
| 5,780,784 A | 7/1998 | Robbins | |
| 5,852,262 A | 12/1998 | Gill et al. | |
| 5,886,303 A | 3/1999 | Rodney | |
| 5,936,913 A | 8/1999 | Gill et al. | |
| 6,026,913 A * | 2/2000 | Mandal et al. | 175/45 |
| 6,173,793 B1 * | 1/2001 | Thompson et al. | 175/45 |
| 6,470,275 B1 | 10/2002 | Dubinsky | |
| 6,568,486 B1 * | 5/2003 | George | 175/45 |
| 6,614,360 B1 | 9/2003 | Leggett, III et al. | |
| 6,631,327 B2 | 10/2003 | Hsu et al. | |
| 6,661,737 B2 | 12/2003 | Wisniewski et al. | |
| 6,671,224 B1 | 12/2003 | Pabon | |
| 6,678,616 B1 | 1/2004 | Winkler et al. | |
| 6,714,480 B2 | 3/2004 | Sinha et al. | |
| 6,766,252 B2 | 7/2004 | Blanch et al. | |

(Continued)

OTHER PUBLICATIONS

X. M. Tang, et al., "Shear-Velocity Measurements in the Logging-While Drilling Environment: Modeling and Field Evaluations," Petrophysics, vol. 44, No. 2 (Mar.-Apr. 2003), pp. 79-90.

(Continued)

*Primary Examiner* — Hai Phan
*Assistant Examiner* — Franklin Balseca
(74) *Attorney, Agent, or Firm* — Kenneth Liu; Jeremy Berman (57) ABSTRACT

An acoustic logging while drilling tool includes an acoustic transmitter and a linear array of acoustic receivers. At least one of the transmitter and the linear array of receivers is deployed on a blade having an outer diameter greater than that of the tool body. In preferred embodiments the transmitter and linear array are each deployed on a distinct blade. Deployment of the transmitter and/or the receivers on a blade reduces the standoff distance to the borehole wall which tends to improve the signal strength of received guided waves without an increase in transmitter power or receiver sensitivity.

15 Claims, 9 Drawing Sheets

(56) References Cited

U.S. PATENT DOCUMENTS

| | | | |
|---|---|---|---|
| 6,791,899 B2 | 9/2004 | Blanch et al. | |
| 7,035,924 B2 | 4/2006 | DeLuca et al. | |
| 7,039,524 B2* | 5/2006 | Haugland | 702/6 |
| 7,392,135 B2* | 6/2008 | Varsamis et al. | 702/1 |
| 2009/0230969 A1* | 9/2009 | Hall et al. | 324/343 |
| 2011/0073368 A1* | 3/2011 | Han et al. | 175/40 |
| 2011/0188345 A1* | 8/2011 | Wang | 367/34 |

OTHER PUBLICATIONS

X. M. Tang, et al., "A dispersive-wave processing technique for estimating formation shear velocity from dipole and Stoneley waveforms," Petrophysics, vol. 60, No. 1 (Jan.-Feb. 1995), pp. 19-28, 9 Figs.

G. L. Varsamis, et al, "LWD Shear Velocity Logging in Slow Formations Design Decisions and Case Histories," SPWLA 41st Annual Logging Symposium, Jun. 4-7, 2000, Paper O.

C. H. Cheng and M. N. Toksoz, "Elastic Wave Propagation in a Fluid-Filled Borehole and Synthetic Acoustic Logs," Geophysics, vol. 46, No. 7, Jul. 1981, pp. 1042-1053.

D. P. Schmitt, "Shear Wave Logging in Elastic Formations," J. Acoust. Soc. A., 84(6), Dec. 1988, pp. 2215-2229.

M. T. Taner, F. Koehler, and R. E. Sheriff, "Complex seismic trace analysis," Geophysics, vol. 44, No. 6 (Jun. 199); pp. 1041-1063.

C. H. Cheng and M. Nfi Toksoz, "Determination of Shear Wave Velocities in "Slow" Formations," SPWLA 24th Annual Logging Symposium, Jun. 37-30, 1983, Paper V.

Georgios L. Varsamis, et al., "A New MWD Full Wave Dual Mode Sonic Tool Design and Case Histories," SPWLA 40th Annual Logging Symposium, May 30-Jun. 3, 1999, Paper P.

F. El-Wazeer, et al., "Applications for a Full Wave Sonic LWD Tool in the Middle East," Society of Petroleum Engineers 13th Middle East Oil Show & Conference, Apr. 5-8, 2003, SPE 81474.

Jennifer Market, et al., "Processing and Quality Control of LWD Dipole Sonic Measurements," SPWLA 43rd Annual Logging Symposium, Jun. 2-5, 2002, Paper PP.

Chaur-Jian Hsu and Kikash K. Sinha, "Mandrel effects on the dipole flexural mode in a borehole," J. Acoust. Soc. Am. 104(4), Oct. 1998, pp. 2025-2039.

Boonen, P., Yogeswaren, E., "A dual-frequency LWD sonic tool expands existing unipolar transmitter technology to supply shear wave data in soft formations" SPWLA 45th Annual Logging Symposium, Jun. 6-9, 2004.

Market, J. and Deady, R., "Azimuthal Sonic Measurements: New methods in theory and practice" SPWLA 49th Annual Logging Symposium, May 25-28, 2008.

Market, J., "New Broad Frequency LWD Multipole Tool Provides High Quality Compressional and Shear Data in a Wide Variety of Formations" SPWLA 48th Annual Logging Symposium, Jun. 3-6, 2007.

Kozak, M., "Phase Velocity Processing for Acoustic Logging-While-Drilling Full Waveform Data" SPWLA 42nd Annual Logging Symposium, Jun. 17-20, 2001.

* cited by examiner

ACOUSTIC LOGGING WHILE DRILLING TOOL HAVING RAISED TRANSDUCERS

RELATED APPLICATIONS

None.

FIELD OF THE INVENTION

The present invention relates generally to acoustic logging of subterranean formations. More particularly, this invention relates to an acoustic logging while drilling tool in which at least one of a transmitter and a receiver is deployed on a blade.

BACKGROUND OF THE INVENTION

The use of acoustic (e.g., audible and/or ultrasonic) measurement systems in prior art downhole applications, such as logging while drilling (LWD), measurement while drilling (MWD), and wireline logging applications, is well known. Such acoustic measurement systems are utilized in a variety of downhole applications including, for example, borehole caliper measurements, measurement of drilling fluid properties, and the determination of various physical properties of a formation. In one application, acoustic waveforms may be generated at one or more transmitters deployed in the borehole. The acoustic responses may then be received at an array of longitudinally spaced apart receivers deployed in the borehole. Acoustic logging in this manner provides an important set of borehole data and is commonly used in both LWD and wireline applications to determine compressional and shear wave velocities (also referred to as slownesses) of a formation.

It will be appreciated that the terms slowness and velocity are often used interchangeably in the art. They will likewise be used interchangeably herein with the understanding that they are inversely related to one another and that the measurement of either may be converted to the other by simple and known mathematical calculations. Additionally, as used in the art, there is not always a clear distinction between the terms LWD and MWD. Generally speaking MWD typically refers to measurements taken for the purpose of drilling the well (e.g., navigation) whereas LWD typically refers to measurements taken for the purpose of analysis of the formation and surrounding borehole conditions. Nevertheless, these terms are herein used synonymously and interchangeably.

In the analysis of acoustic logging measurements, the received acoustic waveforms are typically coherence processed to obtain semblance data which may be displayed on a time-slowness plot. In a time-slowness plot, also referred to as a slowness-time-coherence (STC) plot or a semblance plot, a set of several signals from the array of acoustic receivers is processed with the incorporation of separate time shifts for each received signal. The separate time shifts are based on a slowness value assumed for the purpose of processing the waveforms. The processing provides a result, known as coherence, which can signify the presence of a discernable signal received by the separate receivers. In this manner compressional and shear wave arrivals can be discerned in the received waveforms. The compressional and shear wave slownesses so determined are related to compressive and shear strengths of the surrounding formation, and thus provide useful information about the formation.

In acoustically slow formations, in which the velocity of shear waves is less than the speed of sound in the drilling fluid (mud), shear wave slowness determination is known to be complicated by poor transmission of shear wave energy across the boundary between the formation and the borehole. Various techniques have been developed for determining shear wave slowness in acoustically slow formations. These techniques commonly involve exciting borehole guided waves (e.g., monopole, dipole, or quadrupole modes). The shear wave slowness is then estimated from the guided wave velocity of these modes.

To be useful, the techniques used must excite guided waves of sufficient strength for propagation and detection. In some boreholes this can be problematic, for example, if the borehole diameter is much larger than the tool body, and the tool is located near the center of the borehole. Excitation of sufficiently strong guided waves can also be a problem if the borehole is deviated (and/or the tool is decentralized in a large borehole) and the transmitter and receiver face away from the closest borehole wall.

One way to address this difficulty is to increase the strength of the acoustic transmitter, increase the sensitivity of the receivers, or both. However, because acoustic energy may also be transmitted from the transmitter to the receivers through the tool body as tool noise, these modifications to the transmitter power and/or receiver sensitivity also increase tool noise. Another option may be to decentralize the tool in the borehole and include advanced processing capability in the tool, for example, that uses tool face angle information to determine when the transmitter standoff is small. In this way, transmitter firing times could be selected for when standoff is optimum. But this tends to be a complex solution and adds to the expense of the tool.

Another problem commonly encountered in shear wave slowness determination is the aliasing of the compressional wave signal in acoustically slow formations. This "aliasing effect" may mask or mimic the presence of a shear wave signal, and tends to be particularly harmful when the alias is close to an expected shear wave arrival time. The effect of aliasing can be diminished by reducing the distance between acoustic receivers, but this also reduces array coverage which can increase uncertainty in coherence analysis, unless more receivers are added, at more expense.

Yet another difficulty encountered in shear wave slowness determination is that guided wave propagation tends to be highly dispersive in LWD applications. Although STC analysis is widely used, dispersive effects in the received waveforms can reduce the reliability of the STC analysis. By dispersive it is meant that the measured guided wave slowness is frequency dependent. The amount of dispersion depends on many factors in addition to the shear slowness of the formation. These factors include, for example, tool body properties, eccentricity, borehole diameter, propagation frequency, compressional slowness, and mud density and slowness. In order to obtain a suitably accurate shear slowness value, processing that relies upon values for these factors is required. This processing is commonly referred to in the art as "dispersion correction". In many applications, values for each of these other factors are not accurately known, which can in turn lead to errors in the shear slowness estimate. Moreover, in some formations large dispersion correction may be required, which can further contribute to uncertainty in the shear wave slowness.

Another drawback with the aforementioned techniques is that logging while drilling tools configured for transmitting and/or receiving the relatively pure acoustic modes mentioned earlier require highly complex transmitter and/or receiver configurations, which tend to be expensive. For example, transmitters configured to produce a pure acoustic mode typically include numerous (e.g., four, eight, or even more) distinct transducer elements deployed about the circumference of the tool body. In order to produce a pure mode and to suppress other modes, highly precise phasing (timing) of the various transducers is typically required. The difficulty in generating such acoustic signals is also known to be further exacerbated by tool eccentricity in the borehole (e.g., in highly deviated wells in which the tool typically lies on the low side of the borehole). Moreover, the use of such complex transmitters and receivers in severe downhole conditions including extreme temperatures and pressures, severe mechanical shocks and vibrations (up to 650 G per millisecond) tends to reduce tool reliability.

Therefore, there exists a need for an improved downhole acoustic logging tool suitable for use in determining a shear wave velocity of a subterranean formation. In particular, it will be appreciated that a logging while drilling tool that can accommodate downhole geometries that tend to inhibit borehole guided wave generation, propagation, and/or detection would be highly advantageous, since many of the above stated disadvantages would thus be obviated.

SUMMARY OF THE INVENTION

The present invention addresses one or more of the above-described drawbacks of prior art acoustic logging while drilling tools. In one exemplary embodiment, the invention includes an acoustic logging while drilling tool in which at least one of an acoustic transmitter and a linear array of acoustic receivers is deployed on a blade having an outer diameter greater than that of the tool body. In preferred embodiments the transmitter and linear array are each deployed on a distinct blade. In various other embodiments, the receivers in the linear array are non-uniformly spaced such that a first spacing between a first pair of consecutive acoustic receivers in the array is not equal to a second spacing between a second pair of consecutive acoustic receivers in the array.

Exemplary embodiments of the present invention provide several technical advantages. For example, deployment of the transmitter and/or the receivers on a blade reduces the standoff distance to the borehole wall. The reduced standoff tends to significantly improve the signal strength of received guided waves without an increase in transmitter power or receiver sensitivity. This in turn tends to significantly improve the accuracy of shear slowness measurements, particularly in acoustically slow formations.

Moreover, embodiments of the invention, having a reduced standoff distance, may advantageously enable leaky shear wave arrivals (also referred to in the art as evanescent shear wave arrivals) to be detected. Shear wave slownesses may then be directly determined in acoustically slow formations using the leaky shear wave arrivals, thereby potentially improving accuracy as compared to prior art techniques.

Furthermore, the use of blades, when properly configured, advantageously centralizes the tool in the borehole, which in turn tends to reduce the dependence of the received waveforms and measured slownesses on the tool azimuth in the borehole. This feature of the invention may be particularly useful in making logging while drilling acoustic anisotropy measurements.

In one aspect the present invention includes an acoustic logging while drilling tool. The LWD tool includes at least one blade deployed on a logging while drilling tool body. The tool further includes an acoustic transmitter configured to transmit an acoustic waveform into a subterranean formation and a linear array of acoustic receivers including a plurality of longitudinally spaced apart acoustic receivers. The acoustic receivers are configured to receive a transmitted acoustic waveform. At least one of the acoustic transmitter and the linear array of acoustic receivers is deployed on the blade.

In another aspect, the present invention includes an acoustic logging while drilling tool. At least first and second longitudinally and azimuthally spaced apart blades are deployed on a logging while drilling tool body. A unipole acoustic transmitter is deployed on the first blade, the transmitter being configured to transmit an acoustic waveform into a subterranean borehole. A linear array of unipole receivers is deployed on the second blade, the array including a plurality of longitudinally spaced apart acoustic receivers. The acoustic receivers are configured to receive a transmitted acoustic waveform. The array has a non-uniform spacing such that a first spacing between a first pair of consecutive acoustic receivers in the array is not equal to a second spacing between a second pair of consecutive acoustic receivers in the array.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

With respect to FIGS. 1 through 6, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 6 may be described herein with respect to that reference numeral shown on other views.

Figure 1:
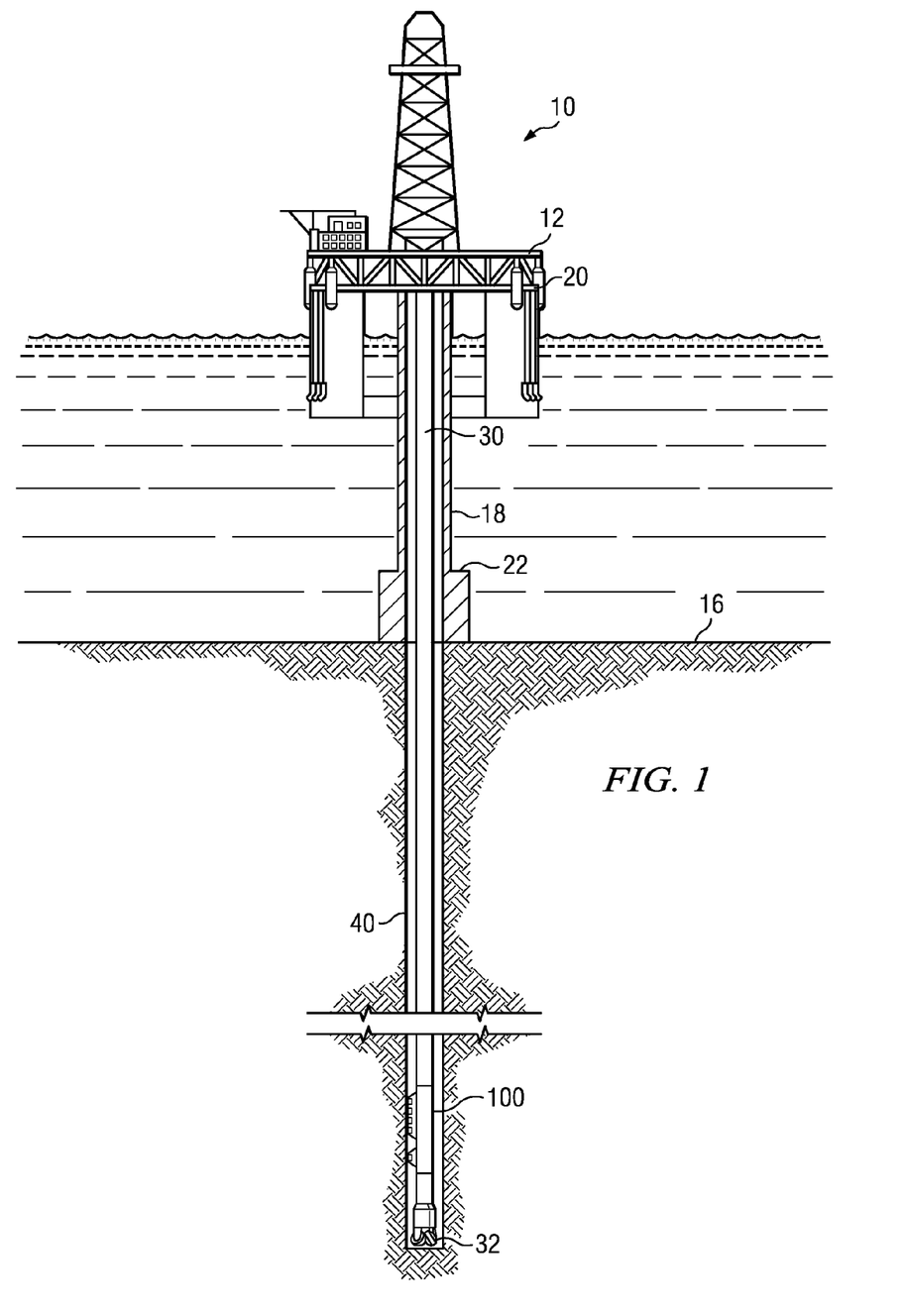
FIG. 1 depicts one exemplary embodiment of an acoustic logging while drilling tool in accordance with the present invention in use in an offshore oil or gas drilling assembly.

FIG. 1 depicts one exemplary embodiment of an acoustic logging while drilling (LWD) tool 100 according to this invention in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and LWD tool 100. Drill string 30 on FIG. 1 may further include a downhole drill motor, a mud pulse telemetry system, and one or more other sensors, such as a nuclear logging instrument and/or an acoustic caliper tool, for sensing downhole characteristics of the borehole and the surrounding formation. The invention is not limited in these regards.

In the exemplary embodiment shown, and described in more detail below, for example, with respect to FIG. 4, LWD tool 100 includes at least one unipole transmitter 120 and at least one linear array 140 of longitudinally spaced apart unipole receivers. The linear array 140 is longitudinally spaced from the transmitter 120. In the exemplary embodiment depicted, the acoustic transmitter 120 and the array 140 of acoustic receivers are deployed on distinct blades that extend radially outward from the tool body 110. The blades are configured to be in contact (or near contact) with the borehole wall during drilling.

It will be understood by those of ordinary skill in the art that the acoustic LWD tool 100 of the present invention is not limited to use with a semisubmersible platform 12 as illustrated in FIG. 1. LWD tool 100 is equally well suited for use with any kind of subterranean drilling operation, either offshore or onshore. Before describing LWD tool 100 in more detail in connection with FIG. 3, features of a prior art tool are discussed.

Figure 2:
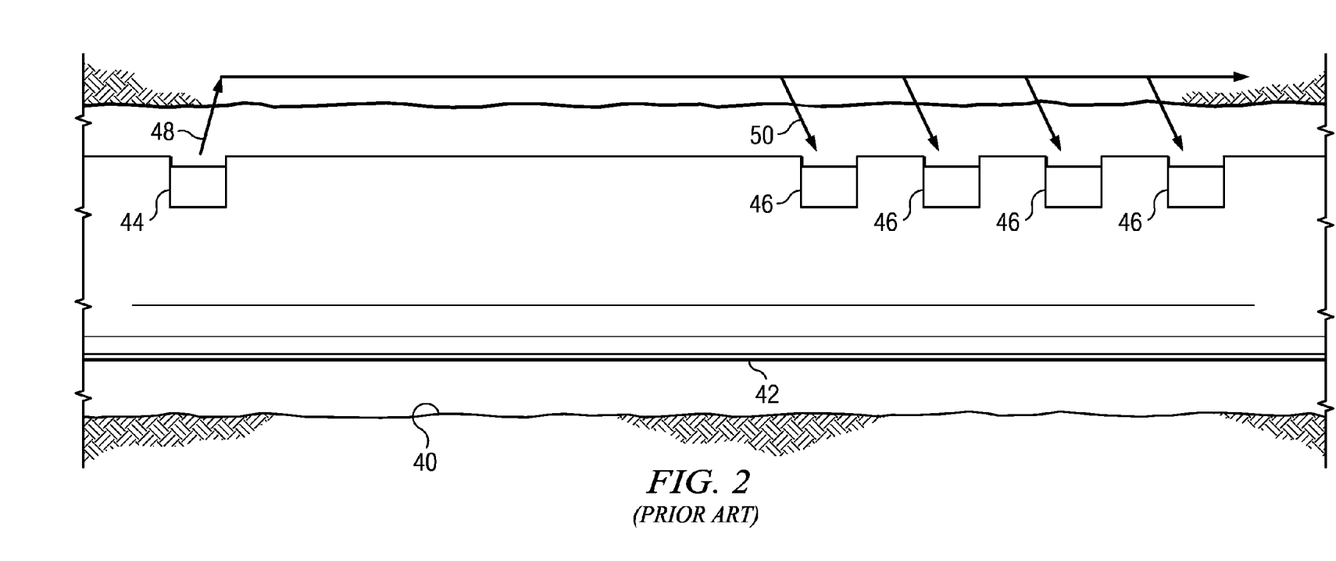
FIG. 2 depicts a cross sectional view of a portion of a prior art acoustic logging while drilling tool deployed in a borehole.

FIG. 2 depicts a cross sectional view of a portion of a prior art acoustic logging while drilling tool 42 deployed in a borehole 40. Logging tool 42 is similar to that disclosed in commonly assigned U.S. Pat. No. 7,039,524 to Haugland (the Haugland patent) and includes a unipole transmitter 44 longitudinally offset from a linear array of longitudinally spaced apart unipole receivers 46. The transmitter 44 and receivers 46 are circumferentially aligned, i.e., they are deployed at the same azimuthal position on the tool body. As also shown, the receivers 46 are equally (or uniformly) spaced, e.g., at a spacing between about 6 and 12 inches.

It will be understood that as used herein the term "unipole transmitter" refers to a transmitter (a source) including exactly one transducer located at a single azimuthal position on the tool body. The unipole transmitter therefore tends to propagate a directional pressure pulse. Similarly, the term "unipole receiver" will be understood to refer to a receiver including exactly one transducer located at a single azimuthal position on the tool body. The unipole receiver tends to have a directional sensitivity to an incoming acoustic wave, complementary to the directionality of the single transducer used in a unipole transmitter. It should be noted that unipole transmitters and receivers (as the terms are used herein) are distinct from monopole transmitters and receivers. A conventional monopole transmitter, for example, includes multiple circumferentially spaced transducers (e.g., 4, 8, or even more) deployed about the tool body. These multiple transducers are configured to fire simultaneously so as to produce a pressure pulse that radiates omni-directionally away from the monopole transmitter. Unipole transmitters and receivers are also distinct from dipole and quadrupole transmitters and receivers, which also typically utilize multiple circumferentially spaced transducers deployed about the tool body. These pure (or pseudo pure) mode transmitters and receivers typically further include complex circuitry configured, for example, to ordain the relative timing of the various transducers (e.g., the timing of firing in a transmitter). No such circuitry is required in a unipole transmitter.

Moreover, it will be further understood that a logging tool having a "single unipole transmitter" refers to a tool including exactly one unipole transmitter configured to transmit acoustic waves at any one particular frequency. It will be understood, for example, that a logging tool having a "single unipole transmitter" may include a second transmitter configured to transmit acoustic waves at a distinct (different) second frequency. A logging tool having a "single linear array of unipole receivers" refers to a tool including exactly one linear array of unipole receivers. A "linear array of unipole receivers" refers to a plurality of longitudinally spaced unipole receivers deployed at a single azimuthal (circumferential) position on the tool body.

With reference again to FIG. 2, those of ordinary skill in the art will appreciate that a unipole transmitter 44 transmits acoustic energy into the borehole as depicted at 48 during acoustic logging operations. A portion of the transmitted energy may enter the formation and induce compressional and/or shear waves therein. These waves propagate through the formation and may be received at the unipole receivers 46 as depicted at 50. As is known in the art, the received compressional and shear waves may be utilized to compute compressional and shear wave velocities (slownesses) of the formation (e.g., via conventional time-of-flight calculations). The compressional and shear wave velocities are known to be related to compressive and shear strengths of the surrounding formation, and thus provide useful information about the formation.

As described above in the Background Section, determination of shear slowness in acoustically slow formations can be difficult owing to the lack of shear waves refracted back into the borehole fluid. Shear waves propagating in the formation leak energy into the borehole fluid as evanescent waves (also referred to as leaky shear waves) which decay exponentially with distance from the borehole wall. These evanescent waves are usually not detectable by a logging tool. Certain prior art methods intended to overcome this problem commonly involve measuring the slowness of a relatively pure mode borehole guided wave, such as Stoneley waves (excited by monopole sources), flexural waves (excited by dipole sources), and screw waves (excited by quadrupole sources). In LWD applications, the trend in the art is clearly towards the use of broadband quadrupole waveforms (see, for example, Tang, et al., in *Petrophysics, vol.* 44, pgs. 79-90, 2003). As described above, generating and receiving pure mode guided waves (e.g., screw waves) requires complex transmitter and receiver assemblies, which in turn increases tool expense and tends to reduce reliability.

A unipole tool (e.g., tool 42 in FIG. 2) makes use of a mixture of Stoneley, flexural, and screw waves (which are also referred to in the art as monopole, dipole, and quadrupole waves). The Haugland patent teaches a method in which mixed mode signals (referred to in the Haugland patent as multi-pole) may be utilized to determine a shear slowness without isolating, suppressing, or enhancing any particular waveform modes in either transmission or reception of the acoustic energy. The waveforms may be taken as they are received. For example, activities such as filtering, interference, or adding or subtracting of various waveforms from one transducer with that of another, are not required. Likewise, it is not necessary to deploy transmitters or receivers having a particular geometry, or to ordain the timing of various components to transmit or receive substantially pure or pseudo pure monopole, dipole, or quadrupole waveforms. As such, the Haugland patent purports to obviate the need for the complex transmitters and receivers of the prior art.

Figure 3:
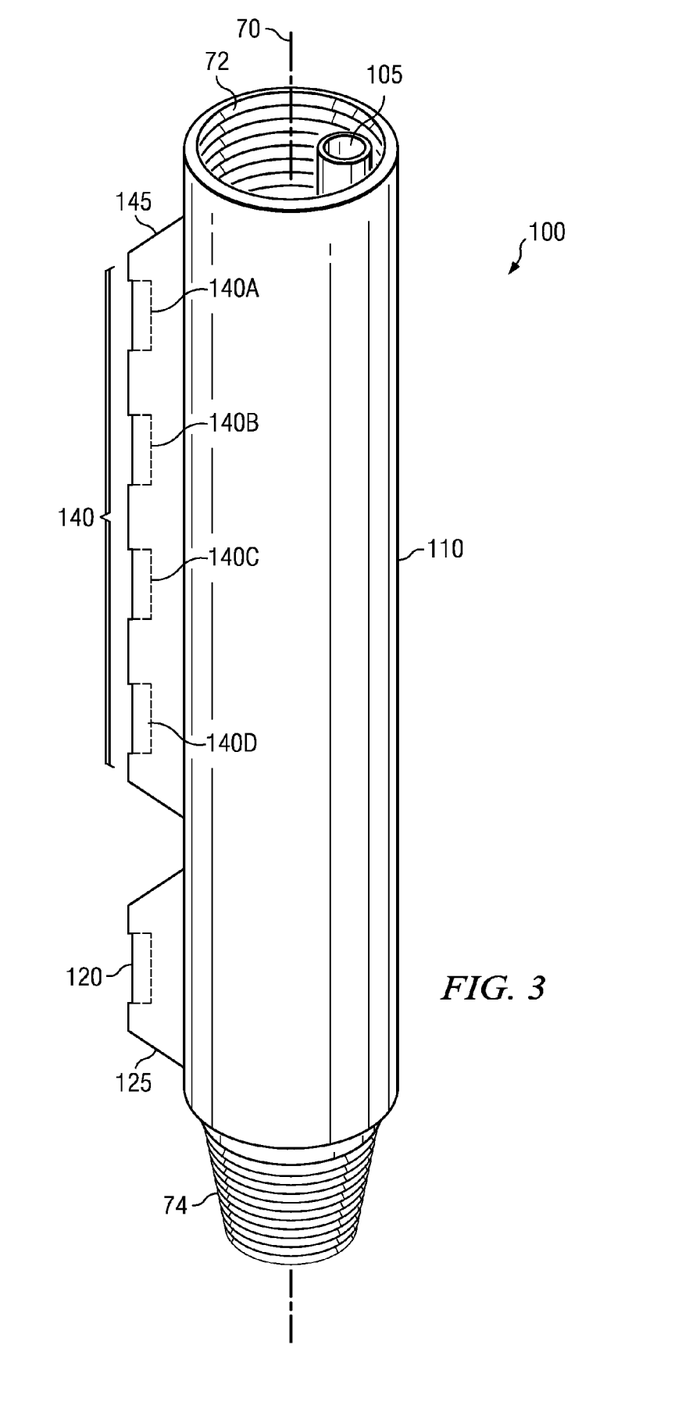
FIG. 3 depicts one exemplary embodiment of an acoustic logging while drilling tool in accordance with the present invention.

FIG. 3 depicts one exemplary embodiment of an acoustic logging while drilling (LWD) tool 100 in accordance with the present invention. LWD tool 100 is typically a substantially cylindrical tool, being largely symmetrical about longitudinal axis 70. LWD tool 100 includes a substantially cylindrical downhole tool body 110 configured for connecting to a drill string and therefore typically, but not necessarily, includes threaded end portions 72 and 74. Through pipe 105 provides a conduit for the flow of drilling fluid downhole, for example, to a drill bit assembly.

LWD tool 100 includes first and second blades 125 and 145 deployed on (e.g., mounted on or integral with) the tool body 110. In the exemplary embodiment depicted, the tool 100 includes a unipole transmitter 120 deployed on the first blade 125 and a linear array 140 of unipole receivers 140A, 140B, 140C, and 140D (140A-140D) deployed on the second blade 145. The transmitter 120 is configured to transmit an acoustic waveform into a subterranean formation. The receivers 140A-140D are configured to receive the transmitted waveform to produce a set of received waveforms.

In the exemplary embodiment depicted on FIG. 3, the linear array 140 of receivers is azimuthally (circumferentially) aligned with and longitudinally spaced apart from the transmitter 120. While the exemplary embodiment depicted includes four receivers 140A-140D, it will be understood that the invention is not limited to any particular number of receivers. Thus, in some embodiments, the linear array 140 may include, for example, six or more unipole receivers. Moreover, in certain embodiments, the acoustic LWD tool 100 can include a plurality of unipole transmitters 120. For example, LWD tool 100 may include first and second unipole transmitters 120 configured to transmit acoustic energy at corresponding first and second distinct frequencies (e.g., the first transmitter may be configured to transmit an acoustic waveform having a frequency in the range from about 2 to about 8 kHz and the second transmitter may be configured to transmit an acoustic waveform having a frequency in the range from about 10 to about 20 kHz). The invention is not limited in any of these regards.

Blades 125 and 145 may be fixed or actuatable. Fixed blades are generally preferable due to their low cost and simplicity. Fixed blades (e.g., fixed stabilizer blades) are well know in the art and need not be discussed any further. Actuatable (extendable and retractable) blades are also well known in the art (e.g., in certain rotary steerable tools). Rotary steerable blades are commonly actuated via electronically controlled hydraulic mechanisms, for example, as disclosed in U.S. Pat. Nos. 5,168,941; 5,603,386; 6,609,579; and 7,204,325. The invention is not limited to any particular blade design or actuation mechanism. While FIG. 3 depicts first and second blades 125 and 145 deployed at a single circumferential position on the tool body, it will be understood that other blades may be deployed at other circumferential positions so as to stabilize and centralize the tool body 110 in a borehole. Again, the invention is not limited in these regards.

Figure 4A:
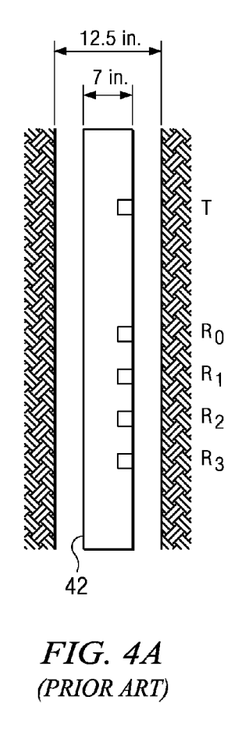
FIGS. 4A, 4B, 4C, and 4D (collectively FIG. 4) depict semblance plots for a model tool similar to the prior art tool depicted on FIG. 2 (FIG. 4A) and for model tool embodiments in accordance with the present invention (FIGS. 4B, 4C, and 4D).
Figure 4B:
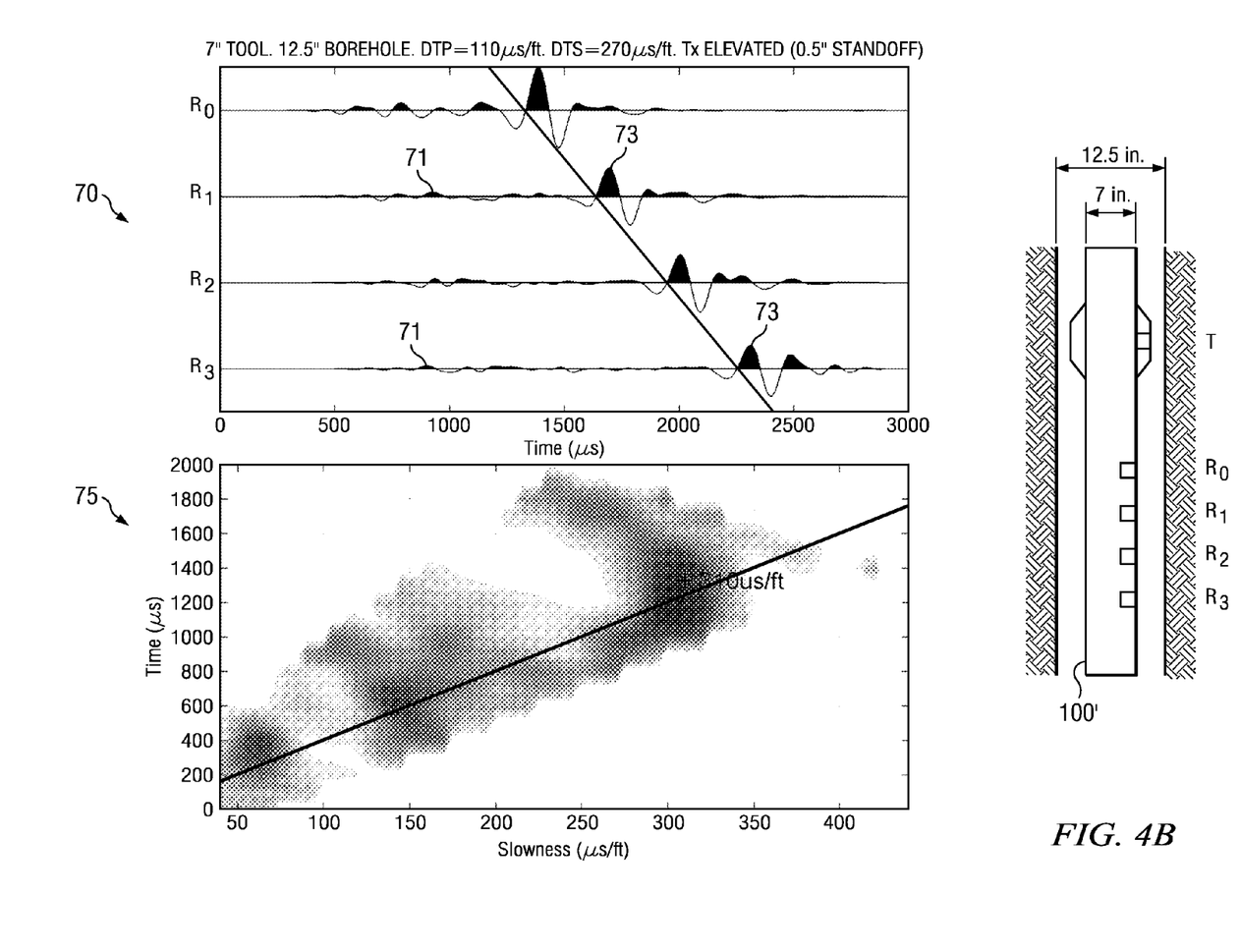
Figure 4C:
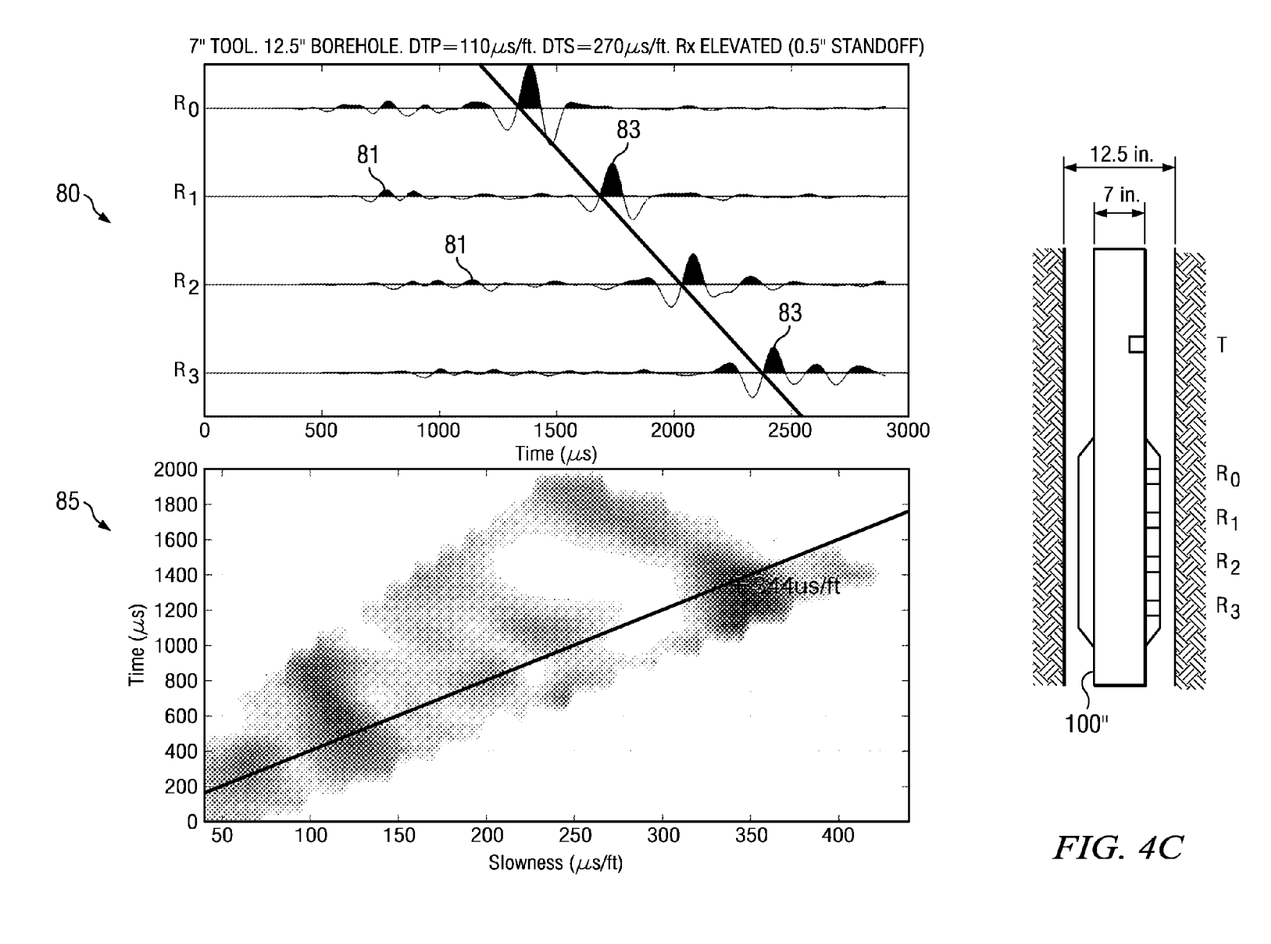
Figure 4D:
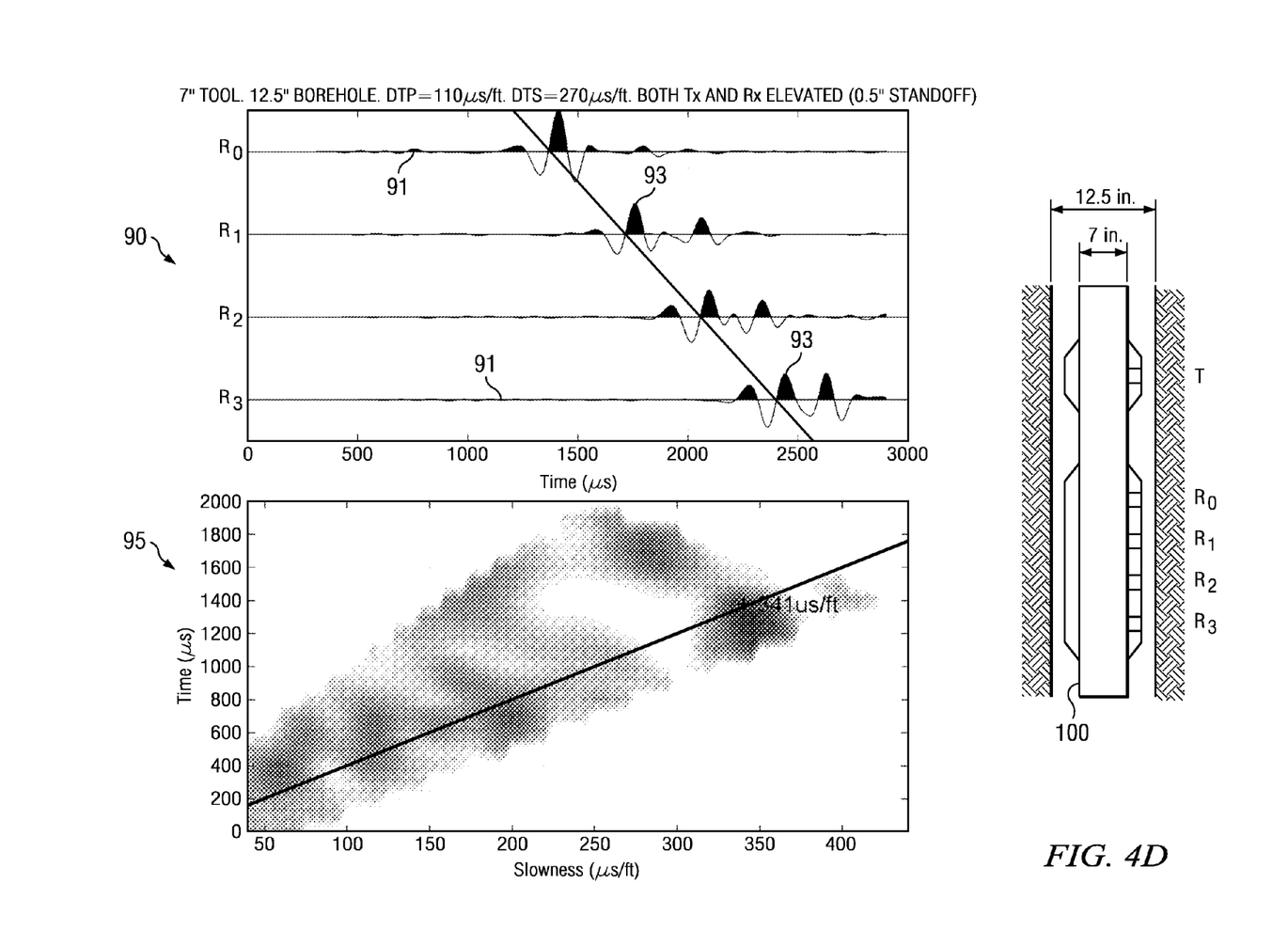

FIGS. 4A, 4B, 4C, and 4D (referred to collectively as FIG. 4) depict semblance plots obtained using modeled acoustic waveforms for the prior art tool configuration (FIG. 4A) and various inventive tool configurations (FIGS. 4B, 4C, and 4D). FIG. 4B models a tool configuration 100' in which the unipole transmitter is deployed on a blade and the linear array of unipole receivers is deployed on the tool body. FIG. 4C models a tool configuration 100" in which the unipole transmitter is deployed on the tool body and the linear array of unipole receivers is deployed on a blade. FIG. 4D models a tool configuration 100 in which the unipole transmitter is deployed on a first blade and the linear array of unipole receivers is deployed on a second blade (e.g., as depicted on FIG. 3). Each of FIGS. 4A, 4B, 4C, and 4D depict the received waveforms (at 60, 70, 80, and 90) in an upper plot and the grayscale semblance data (at 65, 75, 85, and 95) in a lower plot.

In each of the models depicted on FIG. 4, an acoustic LWD tool having a tool body diameter of 7 inches is shown deployed and centered in a subterranean borehole having a diameter of 12.5 inches. In these examples, the blades were further modeled as cylinders centered on the tool axis. The standoff distance between the transducers deployed on the blades (in FIGS. 4B, 4C, and 4D) was assumed to be 0.5 inches. The standoff distance between the transducers deployed on the tool body (FIGS. 4A, 4B, and 4C) was assumed to be 2.75 inches. Each receiver array included four acoustic receivers, denoted $R_0$, $R_1$, $R_2$, and $R_3$.

With continued reference to FIG. 4, deployment of the transmitter and/or receivers on blades is shown to result in a significant guided wave enhancement. In particular, such deployment increases the ratio of the borehole guided wave amplitude to the compressional wave amplitude. In the comparative example (FIG. 4A), the ratio of the borehole guided wave 63 to the compressive wave 61 is about 1:1. When either the transmitter or receivers are deployed on a blade (as depicted on FIGS. 4B and 4C), the ratio of the borehole guided wave 73, 83 to the compressive wave 71, 81 increases to about 15:1. When the transmitter is deployed on a first blade and the receivers are deployed on a second blade (e.g., as depicted on FIGS. 3 and 4D), the ratio of the borehole guided wave 93 to the compressional wave 91 advantageously increases to about 30:1. This signal enhancement tends to advantageously reduce the uncertainty in guided wave picking, especially when the borehole diameter is significantly larger than the tool body diameter. This advantage may be of particular interest when making acoustic LWD measurements of a highly attenuating, soft formation.

Figure 5:
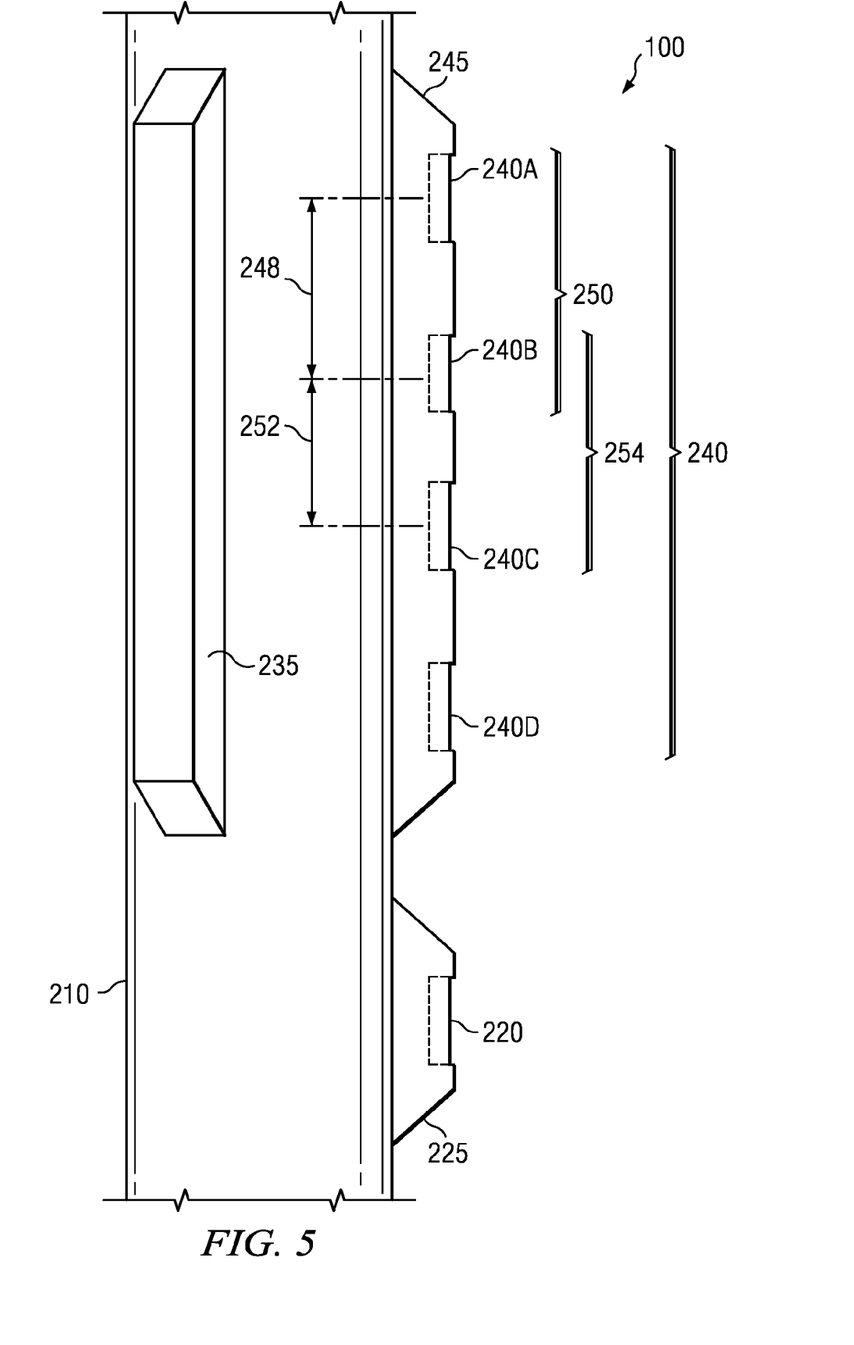
FIG. 5 depicts an alternative embodiment of an acoustic logging while drilling tool in accordance with the present invention.

FIG. 5 depicts an alternative embodiment of an acoustic logging while drilling tool 200 in accordance with the present invention. LWD tool 200 is similar to LWD tool 100 (FIG. 3) in that it includes first and second longitudinally spaced blades 225 and 245 deployed on (e.g., integral with) a tool body 210. A unipole transmitter 220 is deployed on the first blade 225 and a linear array 240 of unipole receivers 240A-D is deployed on the second blade 245.

LWD tool 200 differs from LWD tool 100 in that the unipole receivers 240A-D in the linear array 240 have a non-uniform spacing such that a first spacing 248 between a first pair 250 of consecutive acoustic receivers in the array, for example, receivers 240A and 240B, is not equal to a second spacing 252 between a second pair 254 of consecutive acoustic receivers in the array, for example, receivers 240B and 240C. In other embodiments, the linear array 240 may include a plurality of subarrays, each of the subarrays including a plurality of acoustic receivers, the acoustic receivers in each subarray being uniformly spaced. In one such embodiment, the spacing between the subarrays differs from the spacing between individual receivers in the subarrays. In another such embodiment, the spacing between the receivers in a first subarray differs from the spacing between the receivers in a second subarray. In still another embodiment, at least a portion of the second subarray is interleaved with at least a portion of the first subarray so as to define an interarray distance that is less than one-half the spacing between consecutive receivers in the first array.

The use of non-uniformly spaced receivers tends to advantageously reduce aliasing effects. The individual receivers may be non-uniformly spaced in substantially any suitable manner as is described in commonly invented, commonly assigned, co-pending U.S. patent application Ser. No. 12/700,546 entitled "Downhole Sonic Logging Tool Including Irregularly Spaced Receivers", filed Feb. 4, 2010, which is herein incorporated by reference in its entirety.

In the exemplary embodiment depicted on FIG. 5, the linear array 240 is deployed on one of the blades 245 in a multi-bladed stabilizer (blade 235 is also shown). Such stabilizer configurations commonly include three or more rigid blades and are well known to those of ordinary skill in the art for stabilizing and centralizing various tool embodiments in a borehole. It will be understood that the transmitter 220 may also be deployed on one of the blades in a multi-bladed stabilizer. The invention is not limited in these regards.

With continued reference to FIG. 5, it will be understood that the LWD tool 200 is not limited to embodiments in which transmitter 220 and blade 225 are circumferentially aligned with the linear array 240 and blade 245. In other advantageous embodiments, the transmitter 220 and blade 225 may be circumferentially spaced from the linear array 240 and blade 245. A most preferred circumferential spacing is 180 degrees.

Figure 6:
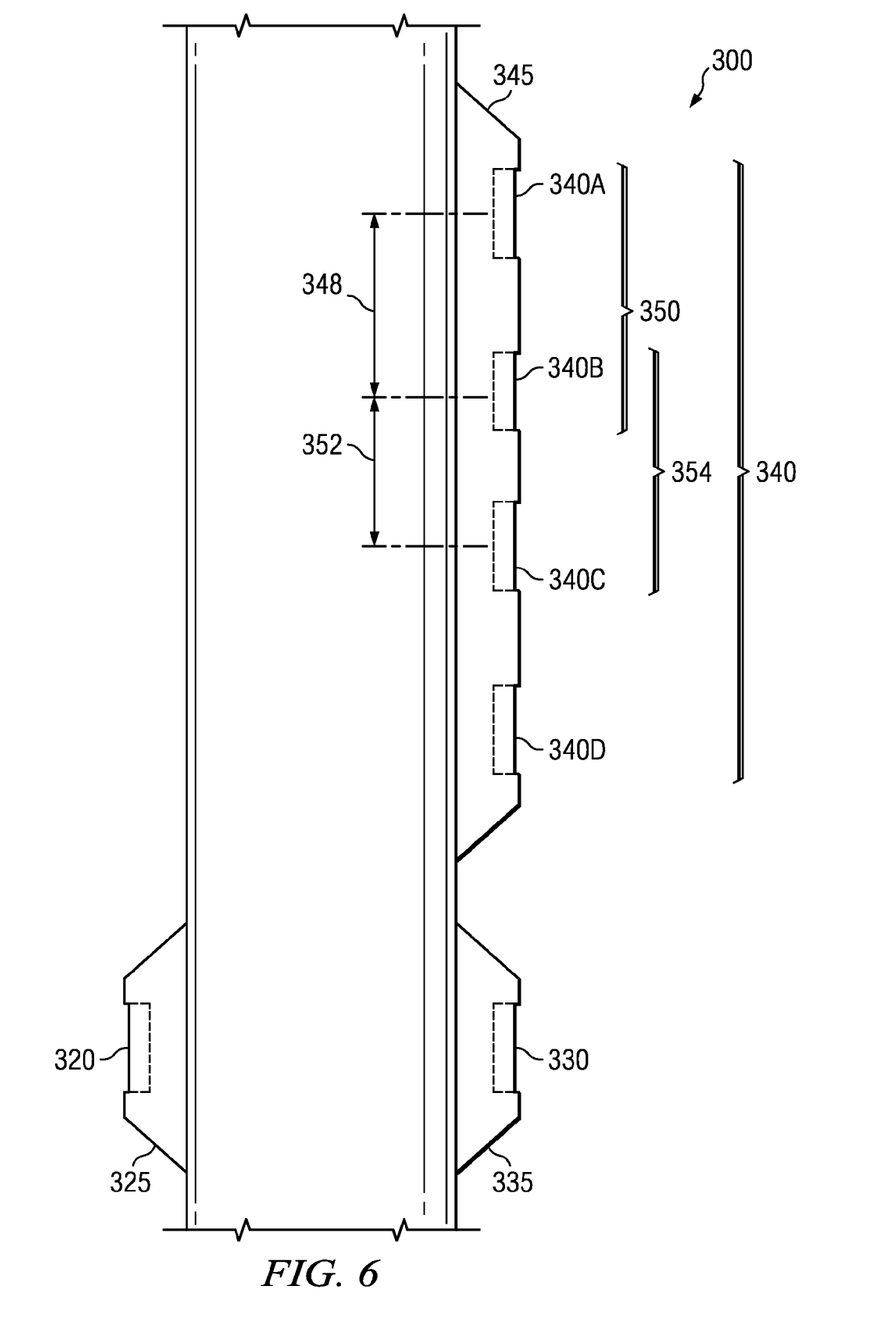
FIG. 6 depicts another alternative embodiment of an acoustic logging while drilling tool in accordance with the present invention.

FIG. 6 depicts another alternative embodiment of an acoustic logging while drilling tool 300 in accordance with the present invention. LWD tool 300 is similar to LWD tool 200 in that it includes a linear array 340 of non-uniformly spaced unipole receivers 340A-D deployed on a receiver blade 345. In the exemplary embodiment depicted the linear array 340 includes a first spacing 348 between a first pair 350 of consecutive acoustic receivers in the array (e.g., 340A and 340B) that differs from a second spacing 352 between a second pair 354 of consecutive acoustic receivers in the array (e.g., receivers 340B and 340C).

LWD tool 300 further includes first and second unipole transmitters 320 and 330 that are longitudinally spaced from linear array 340. In the exemplary embodiment depicted, first and second transmitters 320 and 330 are deployed on corresponding first and second transmitter blades 325 and 335. Blades 325 and 335 are preferably circumferentially opposed (azimuthally spaced by 180 degrees) from one another as depicted. However, the invention is not limited in this regard as the first and second transmitter blades 325 and 335 may be azimuthally spaced apart from one another by a non zero angle other than 180 degrees, for example, by an angle of 90 degrees. It is generally preferred that the receiver blade 345 and transmitter blade 335 be circumferentially aligned with one another and circumferentially spaced from transmitter blade 325 by 180 degrees as depicted.

First and second transmitters 320 and 330 are preferably configured to transmit acoustic waves at correspondingly distinct first and second frequencies. The first transmitter 320 is preferably configured to transmit acoustic waves at a lower frequency than the second transmitter 330. For example, the first transmitter may be configured to transmit acoustic waves having a frequency in the range from about 2 to about 8 kHz and the second transmitter may be configured to transmit acoustic energy at a frequency in the range from about 10 to about 20 kHz. As such, certain embodiments of LWD tool 300 may be described as having a "single unipole transmitter" in that it includes exactly one unipole transmitter configured to transmit acoustic waves at any one particular frequency. Other embodiments may include additional transmitters deployed on blades 325 and 335. The invention is not limited in these regards.

Circumferential spacing of a unipole transmitter and a linear array of unipole receivers tends to advantageously reduce dispersion correction when the received waveforms are processed to obtain shear wave slowness. Further embodiments in which a unipole transmitter is circumferentially spaced from a linear array of unipole receivers are disclosed in commonly invented, commonly assigned, and co-pending U.S. patent application Ser. No. 12/781,222, entitled "Unipole and Bipole Acoustic Logging While Drilling Tools", filed May 17, 2010, which is herein incorporated by reference in its entirety.

It will be appreciated that LWD tools in accordance with the present invention (e.g., tools 100, 200, and 300) may include other types of sensors. For example, such tool embodiments may optionally include one or more ultrasonic standoff sensors deployed on one of the blades to acquire standoff and/or borehole caliper data (which is commonly used in dispersion correction). LWD tools 100, 200, and 300 may further include a directional sensor, including for example, one or more accelerometers or magnetometers.

Although not shown in the FIGURES, it will be appreciated that logging while drilling tools in accordance with the invention typically include an electronic controller. Such a controller typically includes conventional electrical drive voltage electronics (e.g., a high voltage power supply) for applying waveforms to the at least one transmitter to cause the transmitter to transmit an acoustic waveform. The controller typically also includes receiving electronics, such as a variable gain amplifier for amplifying the relatively weak return signal (as compared to the transmitted signal). That is, the controller is configured to cause the array of acoustic receivers to receive corresponding acoustic waveforms induced in the formation by the transmitted acoustic waveform. The receiving electronics may also include various filters (e.g., pass band filters), rectifiers, multiplexers, and other circuit components for processing the return signal. It will be appreciated that the controller may be disposed in the tool body, or may be located remotely from the tool body (e.g., elsewhere in the drill string). The invention is not limited in this regard.

A suitable controller typically further includes a digital programmable processor such as a microprocessor or a microcontroller and processor-readable or computer-readable programming code embodying logic, including instructions for controlling the function of the tool. Substantially any suitable digital processor (or processors) may be utilized, for example, including an ADSP-2191M microprocessor, available from Analog Devices, Inc.

The controller may be further configured to apply time shifts to the received waveforms, with the shifts being based on the spacing (uniform or non-uniform) of the receivers, to produce a set of shifted waveforms. The controller may also be configured to process the set of shifted waveforms to obtain semblance data and to process the semblance data to obtain compressive, shear, and/or guided wave slownesses.

A suitable controller may also optionally include other controllable components, such as other sensors, data storage devices, power supplies, timers, and the like. As described above, the controller may be disposed to be in electronic communication with the various sensors deployed in the drilling system. The controller may also optionally be disposed to communicate with other instruments in the drill string, such as telemetry systems that further communicate with the surface. A controller may further optionally include volatile or non-volatile memory or a data storage device for downhole storage, for example, of received waveforms and computed semblance data. The invention is not limited in these regards.

Although the present invention and its advantages have been described in detail, it should be understood that various changes, substitutions and alternations can be made herein without departing from the spirit and scope of the invention as defined by the appended claims.

I claim:

1. An acoustic logging while drilling tool, comprising:
   a logging while drilling tool body including at least one blade;
   an acoustic transmitter configured to transmit an acoustic waveform into a subterranean formation;
   a linear array of acoustic receivers including a plurality of longitudinally spaced apart acoustic receivers, the acoustic receivers configured to receive said transmitted acoustic waveform, the linear array being longitudinally spaced apart from the acoustic transmitter;
   wherein at least one of the acoustic transmitter and the linear array of acoustic receivers is deployed on the blade; and
   wherein the linear array of acoustic receivers comprises at least first and second subarrays each of which includes a plurality of said acoustic receivers, at least a portion of the second subarray being interleaved with at least a portion of the first subarray so as to define an interarray distance that is less than one-half the spacing between consecutive receivers in the first subarray.

2. The logging while drilling tool of claim 1, wherein the acoustic transmitter is deployed on a first blade and the linear array of acoustic receivers is deployed on a second blade, the first and second blades being longitudinally spaced apart from one another.

3. The logging while drilling tool of claim 1, wherein the blade is deployed in a recess in the tool body and is configured to extend outward from the tool body and to retract inward into the recess.

4. The logging while drilling tool of claim 1, comprising first, second, and third circumferentially spaced blades which in combination are configured to substantially center the tool body in the subterranean borehole, the linear array of acoustic receivers being deployed on the first blade.

5. The logging while drilling tool of claim 1, comprising first, second, and third circumferentially spaced transmitter blades longitudinally spaced apart from first, second, and third circumferentially spaced receiver blades, the transmitter blades and the receiver blades being configured to substantially center the tool body in the subterranean borehole, the transmitter being deploy on the first transmitter blade and the linear array of receivers being deployed on the first receiver blade.

6. An acoustic logging while drilling tool, comprising:
   a logging while drilling tool body including at least first and second longitudinally spaced blades;
   at least one acoustic transmitter mounted on the first blade, the transmitter configured to transmit an acoustic waveform into a subterranean borehole;
   a linear array of receivers mounted on the second blade, the array including a plurality of longitudinally spaced apart acoustic receivers, the acoustic receivers being configured to receive said transmitted acoustic waveform, the array having a non-uniform spacing such that a first spacing between a first pair of consecutive acoustic receivers in the array is not equal to a second spacing between a second pair of consecutive acoustic receivers in the array; and
   wherein the linear array of receivers comprises first and second longitudinally spaced subarrays, each of the subarrays including a plurality of said acoustic receivers, the acoustic receivers in each subarray being uniformly spaced, the first and second subarrays being spaced apart from one another by a distance that is less than a distance between consecutive ones of the acoustic receivers in either of the first and second subarrays.

7. The logging while drilling tool of claim 6, wherein the first blade is azimuthally spaced apart from the second blade by 180 degrees.

8. An acoustic logging while drilling tool, comprising:
   a logging while drilling tool body including at least first and second longitudinally and azimuthally spaced apart blades;
   a unipole acoustic transmitter deployed on the first blade, the transmitter configured to transmit an acoustic waveform into a subterranean borehole;
   a linear array of unipole receivers deployed on the second blade, the array including a plurality of longitudinally spaced apart acoustic receivers, the acoustic receivers being configured to receive said transmitted acoustic waveform, the array having a non-uniform spacing such that a first spacing between a first pair of consecutive acoustic receivers in the array is not equal to a second spacing between a second pair of consecutive acoustic receivers in the array; and
   wherein the linear array of receivers comprises first and second longitudinally spaced subarrays, each of the subarrays including a plurality of said acoustic receivers, the acoustic receivers in each subarray being uniformly spaced, the first and second subarrays being spaced apart from one another by a distance that is less than a distance between consecutive ones of the acoustic receivers in either of the first and second subarrays.

9. The logging while drilling tool of claim 8, wherein the first blade is azimuthally spaced apart from second blade by an angle of about 180 degrees.

10. The logging while drilling tool of claim 8, wherein the first blade is azimuthally spaced apart from the second blade by an angle of about 90 degrees.

11. The logging while drilling tool of claim 8, wherein:
    the first blade is azimuthally spaced apart from second blade by an angle of about 180 degrees; and
    the logging while drilling tool further comprises a second unipole acoustic transmitter configured to transmit an acoustic waveform having a second frequency, the second frequency being unequal to the first frequency.

12. The logging while drilling tool of claim 11, wherein the second unipole acoustic transmitter is deployed on a third blade, the third blade being longitudinally aligned with the first blade and azimuthally aligned with the second blade.

13. An acoustic logging while drilling tool, comprising:
    a logging while drilling tool body including at least first, second, and third blades, the first and third blades being longitudinally aligned and azimuthally spaced apart, the second and third blades being azimuthally aligned and longitudinally spaced apart;
    a first unipole acoustic transmitter deployed on the first blade, the first transmitter configured to transmit an acoustic waveform into a subterranean borehole at a first frequency;
    a second unipole acoustic transmitter deployed on the third blade, the second transmitter configured to transmit an acoustic waveform into a subterranean borehole at a second frequency;

a linear array of unipole receivers deployed on the second blade, the array including a plurality of longitudinally spaced apart acoustic receivers, the acoustic receivers being configured to receive said transmitted acoustic waveform, the array having a non-uniform spacing such that a first spacing between a first pair of consecutive acoustic receivers in the array is not equal to a second spacing between a second pair of consecutive acoustic receivers in the array wherein the linear array of acoustic receivers comprises at least first and second subarrays each of which includes a plurality of said acoustic receivers, at least a portion of the second subarray being interleaved with at least a portion of the first subarray so as to define an interarray distance that is less than one-half the spacing between consecutive receivers in the first subarray.

14. The logging while drilling tool of claim 13, wherein the first blade is azimuthally spaced apart from third blade by an angle of about 180 degrees.

15. The logging while drilling tool of claim 13, wherein the first transmitter is configured to transmit an acoustic waveform having a frequency in a range from about 2 to about 8 kHz and the second transmitter is configured to transmit an acoustic waveform having a frequency in a range from about 10 to about 20 kHz.

* * * * *